_United States Patent Office_  2,773,915
Patented Dec. 11, 1956

2,773,915
POUR POINT DEPRESSANT

Edwin R. Baker and Marion L. Sharrah, Ponca City, Okla., assignors to Continental Oil Company, Ponca City, Okla., a corporation of Delaware No Drawing. Application June 1, 1954,
Serial No. 433,848

1 Claim. (Cl. 260—668)

This invention relates to novel chemical products and to processes of preparing and using the same. More particularly it relates to the use of these compounds for improving the pour point, viscosity index, and other properties of oils, particularly mineral oils, in which they are incorporated.

It has been suggested heretofore to make pour point depressors for waxy lubricating oils by Friedel-Crafts condensation of an aliphatic material such as chlorinated paraffin wax with an aromatic material such as naphthalene or phenol, but the resulting products, although satisfactory for most purposes, are not as good in certain respects as might be desired. It has also been suggested to make lubricating oil additives by the polymerization of an unsaturated ester such as the vinyl ester of stearic acid, or by the polymerization of acrylic acid esters such as octadecyl acrylate, or condensation polymers of an unsaturated alcohol and an unsaturated acid. While some of these latter compounds are good as pour point depressors, they are deficient in other respects. As for example, some show a tendency toward gel formation and toward becoming insoluble in lubricating oil base stocks.

In its broad aspects, the present invention comprises reacting highly complex chloromethylated synthetic still bottoms with a high molecular weight alkylaryl hydrocarbon having a side chain of at least 12 carbon atoms. This reaction is carried out in the presence of a catalyst, preferably anhydrous aluminum chloride, although other catalysts of the Friedel-Crafts type may be used such as boron trifluoride, zinc chloride, ferric chloride, titanium tetrachloride, or anhydrous hydrogen fluoride.

The polyalkylaralkyl chlorides employed in the condensation reaction of the present invention may be produced by the procedure disclosed in U. S. Patent 2,462,426, February 22, 1949, issued to O. M. Reiff and H. D. Hartough entitled "Preparation of Polyalkylbenzyl Phenols" as illustrated by the preparation of methylbenzyl chlorides from a certain fraction of synthetic crude still or tower bottoms which is available commercially. This particular product has a boiling range of 260 to about 400° C. and is a highly refractory petroleum fraction consisting of the bottoms from the distillation of the product resulting from the moving bed catalytic cracking of petroleum oils. Typical physical properties of this product are as follows: $n_D^{25}$=1.574, average molecular weight=210, A. P. I. gravity=15.1, aniline number=73.4° F., percent hydrogen=10.69–10.75, percent carbon=88.88–89.37, hydrogen carbon ratio=1.44, percent non-aromatics=27.8, percent aromatics=72.2, average molecular weight of nonaromatics=245, average molecular weight of aromatics=204. All molecular weights were determined by the cryoscopic method. Specific compounds that occur in these distillation bottoms are believed to include the following: pentamethyl benzene, methylated naphthalenes, methylated anthracenes, phenanthrene, methylated phenathrenes, acenaphthene, and methylated acenaphthenes.

For the purpose of illustrating but not limiting the present invention, the preparation of poly (polyalkylaryl) methanes will be described. The aforedescribed petroleum stock was mixed with an alkyl aldehyde such as formaldehyde, acetaldehyde, etc., in the proportion of 250 parts of the aforesaid aromatic petroleum stock to about 100 parts of 37 percent formaldehyde solution. About 400 parts of concentrated hydrochloric acid was added to the aromatic petroleum stock formaldehyde mixture. The temperature was maintained between about 60 and about 70° C. for about 6 hours. At the end of that period, agitation was stopped and the aqueous layer separated. The hydrocarbon layer was thoroughly washed with water to remove excess hydrochloric acid and aldehyde. The hydrocarbon layer was dried, preferably over calcium chloride and fractionated, the portion distilling over at 110 to 130° C. at 10 millimeters of mercury pressure being a mixture of chloromethylated alkylaryl compounds or polyalkylbenzyl chlorides.

Following the preparation of the chloromethylated synthetic still bottoms they are reacted with the alkylaryl hydrocarbon to produce the products of the present invention. Suitable alkylaryl hydrocarbons for use in our process are those having a side chain of at least 12 carbon atoms and include the following: waxbenzene, waxtoluene, diwaxbenzene, diwaxtoluene, polywaxbenzene, polywaxtoluene, wavnaphthalene, diwaxnaphthalene, polywaxnaphthalene, and a propylene polymer having a boiling range within about 175 to about 250° C. Another product which may be used is a detergent alkylate sometimes called polydodecylbenzene consisting of monoalkylbenzenes and dialkylbenzenes in the approximate ratio of 2:3. Its typical physical properties are as follows:

Specific gravity at 38° C _____ 0.8649
Average molecular weight _____ 365
Percent sulfonatable _____ 88
A. S. T. M. (D–158 Engler):
  I. B. P _____ ° F__ 647
  5 _____ ° F__ 682
  50 _____ ° F__ 715
  90 _____ ° F__ 760
  95 _____ ° F__ 775
  F. B. P _____ ° F__ 779
Refractive index at 23° C _____ 1.4900
Viscosity at:
  −10° C _____ centipoises__ 2800
  20 _____ 280
  40 _____ 78
  80 _____ 18
Aniline number _____ ° C__ 69
Pour point _____ ° F__ −25

In general, the proportions in which the reactants should be used may vary from 4 to 1 moles, preferably 2 to 1 moles of the chloromethylated synthetic still bottoms to one mole of the alkylaryl hydrocarbon. As to the amount of the catalyst used that may vary over a fairly wide range, depending partly upon the nature and the amount of the reactants as well as partly on the temperature and time of the reaction, but usually it should be about 0.1 mole per mole of the alkylaryl hydrocarbon. The reaction temperature should be maintained between the approximate liimts of about 20 to about 30° C., preferably 27 to 30° C. To facilitate the reaction an inert solvent such as refined kerosene, Stoddard Solvent, or similar solvent is added to the mixture. Preferably the catalyst is added slowly to the reactants at room temperature after which the mixture is heated to a temperature of between about 27 to 30° C. and maintained at that point for a sufficient length of time such as 5 to 12 hours, preferably 5 to 7 hours to produce the desired product. After the reaction has been completed, which may in many cases be judged by the cessation of the evolution of hydrogen chloride, the reaction mixture is cooled and neutralized with an aqueous caustic solution causing the formation of two layers, an organic layer and an aqueous layer. The organic layer is removed and distilled under reduced pressure to remove the solvent and low boiling products. The reaction product of this invention is soluble in lubricating oils and is substantially nonvolatile at about 400° F., and it has a fairly high molecular weight. In most cases, it is a dark greenish brown, viscous liquid, although the chemical structure of these products has not been ascertained definitely, it is believed that they are poly (polyalkylaryl) methanes.

The product of this invention has the property of modifying the crystal structure of waxes such as paraffin wax present when added to compositions containing the same. For instance, when about 0.05 to 1 percent, preferably about 0.1 to 1 percent, is added to a waxy lubricating oil such as a Pennsylvania type lubricating oil having a relatively high pour point, the resultant blend will have a substantially lower pour point; in other words this product exhibits a marked depressant effect upon the pour point of a lubricating oil in which it is incorporated. A small amount of this wax modifier is useful as a dewaxing aid for removing wax from lubricating oils of undesirably high wax content. In similar small amounts this product may also be incorporated into paraffin wax or compositions containing the same to be used for various purposes such as for coating or impregnating paper, etc., or for making various molded products.

In order to disclose the nature of the present invention still more clearly, the following illustrative examples will be given in which parts are by weight.

*Example*

86.25 parts of diwaxbenzene (approximately 800 molar equivalent), 2.5 parts of anhydrous aluminum chloride, and 100 parts of Stoddard Solvent were placed in a reaction vessel which was equipped with a stirrer, thermometer, gas exit tube, and dropping funnel. 42.6 parts of chloromethylated synthetic tower bottoms (8.34 percent chlorine and boiling over a temperature range of 138 to 155° C. at a pressure of 3 millimeters of mercury) was added to the reaction vessel dropwise over a one hour period. During the reaction the temperature was maintained between 27 and 30° C. for 6 hours during which time hydrogen chloride was given off and the reaction mixture became black. At the end of the 6-hour period the mixture was neutralized with 122 parts of 20 percent aqueous sodium hydroxide solution. Upon standing the mixture separated into two layers, an upper hydrocarbon layer and a lower aqueous layer. Approximately 115 parts of final product (pour point depressant) was obtained as a residue upon removal of the Stoddard Solvent from the hydrocarbon layer.

The effect of the product prepared according to the foregoing example as a pour point depressant is illustrated in the table below wherein varying percentages were incorporated in 170 S. S. U. pale oil (100° F.).

| Sample | Conc. of depressant, Wt. Percent | A. S. T. M. Pour Point, ° F. |
| --- | --- | --- |
| 170 S. S. U. pale oil | 0.0 | 0 |
| 170 S. S. U. pale oil + pour point depressant | 0.25 | −8 |
| 170 S. S. U. pale oil + pour point depressant | 1.00 | −30 |

It is apparent that many modifications and variations of the invention as hereinbefore set forth may be made without departing from the spirit and scope thereof. The example given is by way of illustration only, and the invention is limited only by the terms of the appended claim.

We claim:

The process of preparing a composition suitable as a lubricating oil pour point depressant which comprises reacting chloromethylated synthetic still bottoms prepared by chloromethylating a synthetic still bottoms product which has a boiling range of 260 to 400° C., $n_D^{25}$ 1.574, average molecular weight 210, A. P. I. gravity 15.1, aniline number 73.4° F., percent hydrogen 10.69–1075, percent carbon 88.88–89.37, percent nonaromatics 27.8, percent aromatics 72.2, average molecular weight nonaromatics 245, and average molecular weight aromatics 204 to a chlorine content of 8.34 percent with diwaxbenzene in the proportions of 1 mole of said chloromethylated compound to from about 0.25 to about 1 mole of said diwaxbenzene at a temperature between about 20 and about 30° C. for a period of time between about 5 to 12 hours, in the presence of aluminum chloride and an inert organic solvent, neutralizing the resulting mixture with an aqueous solution of a base, permitting the mixture to separate into an upper layer composed substantially of said inert solvent, said pour point depressant, and a small amount of unreacted chloromethylated still bottoms and a lower layer composed of substantially water, said aluminum chloride, salt, and unreacted base, separating said upper layer and recovering the pour point depressant therefrom.

References Cited in the file of this patent
UNITED STATES PATENTS

| | | |
| --- | --- | --- |
| 2,297,292 | Davis et al. | Sept. 29, 1942 |
| 2,340,968 | Lieber | Feb. 8, 1944 |
| 2,468,500 | Lieber | Apr. 26, 1949 |
| 2,620,353 | Lippencott et al. | Dec. 2, 1952 |